United States Patent Office 3,823,093
Patented July 9, 1974

3,823,093
SILVER CAPACITOR METALLIZATIONS CONTAINING COPPER POLYNARY OXIDES
Rajnikant Babubhai Amin, Wilmington, Del., assignor to E. I. du Pont de Nemours and Company, Wilmington, Del.
No Drawing. Filed June 30, 1972, Ser. No. 268,055
Int. Cl. H01b 1/02
U.S. Cl. 252—514                                    15 Claims

ABSTRACT OF THE DISCLOSURE

In silver and palladium/silver metallizations for conductors on dielectric substrates, improved metallizations fireable above the melting point of silver without circuit interruption, comprising certain crystalline inorganic polynary oxides of copper, e.g. $Cu_2Al_2O_4$, $Cu_3TiO_5$, etc. Multilayer capacitors of alternating layers of such metallizations and dielectric material, and capacitors having such metallizations as end terminations.

BACKGROUND OF THE INVENTION

This invention relates to electronics, and more particularly, to improved conductor compositions for producing circuits therein.

Where high dielectric constant ceramic bodies are desirable, e.g., in producing multilayer capacitors of alternating dielectric layers and electrodes, barium titanate and/or alumina-based bodies are employed. Such ceramics often require firing temperatures in the range 1200–1400° C. to obtain dense (sintered) ceramic bodies. Nondense or porous ceramic bodies are susceptible to moisture, resulting in deterioration of electrical properties.

In forming multilayer capacitors, electrodes are printed on green (unsintered) ceramic tapes, the tapes are stacked, and then the resultant sandwich is fired, i.e., the electrodes and the ceramic are cofired. High firing temperatures dictate using high-melting noble metals (e.g., Pt, Pt/Pd/Au alloys, Pd) as the electrode metallizations; in any case, the electrode must melt above the firing temperature at which the ceramic becomes sufficiently nonporous, since if the metal were to melt the electrode would become discontinuous and ohmic contact (electrical continuity) would be broken.

Several lower sintering ceramics have recently been developed, but sintering above 1000° C. is still necessary to densify the ceramic. Thus, although it is desirable to use silver or silver/palladium metallizations, due to cost versus platinum, gold or palladium itself, since silver melts at 960° C. it has not been useful in forming multilayer capacitors.

There is a need for inexpensive metallizations cofireable with ceramics.

SUMMARY OF THE INVENTION

The invention deals with silver electrodes fireable above the melting point of silver for multilayer ceramic capacitors. The invention is to incorporate certain crystalline high-temperature-stable copper oxide compounds, such as copper aluminate, copper titanate, etc., in the electrode composition. These compounds react with silver at a temperature lower than the melting point of silver. When the temperature is raised above the melting point of silver, these compounds prevent coalescence of silver into globules and electrical interruption; the electrode maintains a continuous sheet structure. An important advantage of these new electrode metallizations is that they may also be used as end terminations for the capacitors, and the end terminations may be cofired during the first firing of ceramic dielectric with buried electrode layers.

Specifically, in metallizations of a finely divided noble metal powder of silver or palladium/silver useful for application to ceramic dielectric substrates followed by firing to produce conductor patterns, this invention involves improved metallizations which are fireable above the melting point of silver and cofirable with green dielectric tape; these improved metallizations comprising, in addition to the noble metal powder, a finely divided inorganic polynary oxide compound of copper melting above 1000° C., the amount of said copper compound being effective to prevent coalescence of the noble metal and consequent circuit interruption on firing. These metallizations may be dispersed in an inert liquid vehicle.

The amount of said copper compound is usually in the range of about 0.5–30% by weight (preferably 0.5–8%) of the weight of noble metal powder. The copper compound may be $Cu_2Al_2O_4$, $Cu_3TiO_5$, $CuO \cdot Fe_2O_3$, $$CuO \cdot Mn_2O_3$$

$CuO \cdot Co_2O_3$, $Cu_2O \cdot Cr_2O_3$, etc.; preferably $Cu_2Al_2O_4$ and $Cu_3TiO_5$.

This invention also involves a dielectric substrate having such metallizations fired thereon. Specifically, the invention may be multilayer capacitors of alternating layers of sintered dielectric material and the fired metallization, and capacitors with cofireable end terminations of such metallizations.

DETAILED DESCRIPTION OF THE INVENTION

The essential component in the improved metallizations of the present invention is a copper compound. Specifically, it is a crystalline inorganic polynary oxide compound of copper melting above 1000° C. By "polynary" it is meant that the inorganic compound contains three or more elements, that is, in addition to copper and oxygen, at least one other element is present therein. Such elements comprise, for example, aluminum $$(e.g., in\ Cu_2Al_2O_4),$$

titanium (e.g., in $Cu_3TiO_5$), iron (e.g., in $CuO \cdot Fe_2O_3$), manganese (e.g., in $CuO \cdot Mn_2O_3$), cobalt $$(e.g., in\ CuO \cdot Co_2O_3),$$

chromium (e.g., in $Cu_2O \cdot Cr_2O_3$), etc. Such compounds may preferably be described as selected from the class consisting of $Cu_2Al_2O_4$, $Cu_3TiO_5$, $CuO \cdot Fe_2O_3$, $$CuO \cdot Mn_2O_3,$$

$CuO \cdot Co_2O_3$, $Cu_2O \cdot Cr_2O_3$. Optimum copper compounds of this invention are $Cu_2Al_2O_4$ (copper aluminate), which, of course, may also be written as $CuAlO_2$, and $Cu_3TiO_5$ (copper titanate).

The function of the copper compound is to prevent coalescence of the silver at firing temperature above the melting point of silver. Such melting would cause circuit interruption; the fired metallizations would be electrically discontinuous.

Typically, the amounts of the copper compound effective for this purpose are 0.5–30% by weight of the weight of noble metal powder (Ag and optional Pd) and for copper aluminate and copper titanate are preferably 0.5–10%. The copper compound is finely divided (preferably passes through a 325 mesh screen).

This invention relates to metallizations useful for printing conductor patterns on dielectric substrates, usually ceramic dielectric substrates. The conductive component of the metallization is finely divided silver powder, or a mixture of finely divided silver powder and palladium powder. Where a palladium silver mixture is used, the amount of palladium used will depend upon the desired characteristics of the metallization, such as melting point, conductivity, reactivity with solder, cost, etc. Generally, up to 20% of the total weight of palladium and silver may be palladium. Stated another way, the noble metal content of the metallizations will generally contain 0–0.25 part of palladium per part of silver, by weight.

The noble metal powers in such metallizing compositions are typically finely divided enough to pass through a 325-mesh screen (U.S. standard sieve scale). Thus, no particles are greater than 40 microns. Desirably the metals have an average particle size in the range 0.1–5 microns.

The metallization solids may be dispersed in an inert liquid vehicle, as is conventional in the art, to produce metallizing compositions, by mechanical mixing. The solids/vehicle ratio and the nature of the vehicle selected will depend upon the desired paste properties, and to some extent will depend upon the method of application of the dispersion to a substrate (e.g., by screen stenciling, spraying, dipping, brushing, etc.). The selection of vehicle and solids/vehicle ratio is within the skill of one versed in the art.

Any inert liquid may be used as the vehicle. Water or any one of various organic liquids, with or without thickening and/or stabilizing agents and/or other common additives, may be used as the vehicle. Exemplary of the organic liquids which can be used are the aliphatic alcohols; esters of such alcohols, for example, the acetates and propionates; terpenes such as pine oil, $\alpha$- and $\beta$-terpineol and the like; solutions of resins such as the polymethacrylates of lower alcohols, or solutions of ethyl cellulose, in solvents such as pine oil and the monobutyl ether of ethylene glycol monoacetate. The vehicle may contain or be composed of volatile liquids to promote fast setting after application to the substrate. Alternately, the vehicle may contain waxes, thermoplastc resins or like materials which are thermofluids, so that the vehicle containing metallizing composition may be applied at an elevated temperature to a relatively cold ceramic body upon which the metallizing composition sets immediately.

The ratio of inert vehicle to solids in the metallizing compositions of this invention may vary considerably and depends upon the manner in which the dispersion of metallizing composition in vehicle is to be applied and the kind of vehicle used. Generally, from 1 to 20 parts by weight of solids per part by weight of vehicle will be used to produce a dispersion of the desired consistency. Preferably, 4–10 parts of solid per part of vehicle will be used. Optimum dispersions contain 30–70% liquid vehicle.

As indicated above, the metallizing compositions of the present invention are printed onto ceramic substrates, and green ceramic (unfired) after which the printed substrate or green ceramic is fired to mature the metallizing compositions (and green ceramic) of the present invention, thereby forming electrically continuous conductors.

Examples

The following examples are given to illustrate the present invention. In the examples and elsewhere in the specification and claims, all parts, percentages, ratios, etc., are by weight. In the examples the vehicle employed to make dispersions of the metallizing compositions was 90% $\beta$-terpineol and 10% ethyl cellulose. The noble metals employed had an average particle size in the range 0.1–5 microns; the copper compounds were −325 mesh (particle size).

Copper titanate was prepared as follows. One mole of $TiO_2$ was mixed with 3 moles of CuO and this mixture was sintered at 1050° C. for 4 hours. The sintered aggregates were broken nd the powder was sintered again at 1050° C. for 4 hours. The sintered product was ball milled and sieved through a 325 mesh sieve.

Copper aluminate was prepared as follows. One mole of $Cu_2O$ was mixed with two moles of $Al(OH)_3$. The mixture was sintered at 1250° C. for 4 hours. The aggregates were broken and the powder was sintered again at 1250° C. for 4 hours. The sintered product was ball milled for 16 hours and sieved through a 325 mesh sieve.

Effective dielectric constant (effective K) and dissipation factor (D.F.) were determined as follows. The fired capacitors were mounted in the jaws of an automatic RLC Bridge (General Radio Model No. 1683) where both capacitance (pf.) and D.F. (percent) were automatically read. Knowing the capacitance, dimensions of electrode and thickness of fired dielectric, effective K was determined as follows:

Effective $K$
$$= \frac{\text{(Reading in picofarads) (thickness) } (2.9 \times 10^{-2})}{\text{area of electrode}}$$

thickness being in mils and area in square centimeters.

The thickness of fired electrodes was about 0.5 mil; the dielectric thickness was in the range 1–3 mils. The fired electrodes of the capacitors of the Examples had an area of about ⅛-inch square.

Example 1

Metallizations of silver plus (a) 25% copper titanate and (b) 25% copper aluminate were fired above the melting point of silver (960.8° C.); the copper compounds prevented silver coalescence at 1030° C.; effective circuits were produced.

The following silver electrode compositions were prepared and printed on a dense (sintered) aluminum oxide ceramic substrate with 200 mesh screen as a ½ in. by ¼ in. pattern:

|  | (a) | (b) |
|---|---|---|
| Silver | 48.0 | 48.0 |
| Copper titanate ($Cu_3TiO_5$) | 12.0 | |
| Copper aluminate ($CuAlO_2$) | | 12.0 |
| Vehicle | 40.0 | 40.0 |

Triplicate samples were subjected to the following firing schedule: 500° C., 1 hour; 930° C., ½ hour; and 1030° C., 2 hours. The resultant resistance measured by the four probe method (milliohm/square) was 23, 45 and 38 for (a) and 125, 200 and 150 for (b). There was no apparent coalescence of silver and the electrode surface was fairly smooth. The electrode remained in one sheet form (did not coalesce into beads) and the resistance was low enough for multilayer ceramic capacitor electrode application.

Example 2

A thin sheet of ceramic with polymeric binder was cast with a dispersion on a polyethylene coated polyester film. A doctor blade setting of 15 mils gave dried unsintered thickness of 5.5 mils.

The inorganic solid to binder proportion in the dispersion was 96 to 75. The binder was (parts by weight), Dow Methocel methyl cellulose 2% aqueous solution, 10; Rohm & Haas Rhoplex E32 Acrylic Emulsion, 10; and water, 55. The binder and the ceramic solids were mixed in a ball mill for 45 minutes before casting into a thin sheet (tape). The composition of the inorganic ceramic for the dispersion was, weight percent, $BaTiO_3$, 91.5; $Ta_2O_5$, 1.0; $Fe_2O_3$, 0.5; and bismuthate glass, 7.0 ($Bi_2O_3$, 82.0; PbO, 11.0; $B_2O_3$, 3.5; and $SiO_2$, 3.5).

Metallizing composition (b) of Example 1 was used to make a three-layer capacitor with four electrode layers buried in dielectric. The electrode composition was printed with 200 mesh screen. The metallized dielectric layers were laminated at 50,000 p.s.i. pressure. Firing was conducted at the following schedule: room temperature to 500° C. in about 1 hour and hold at 500° C. for 1 hour to burn the organic matter; from 500° C. to 930° C. in about 1 hour and at 930° C. for 1 hour to react silver with copper aluminate; from 930 to 1030° C. in about 20 minutes and at 1030° C. for 2 hours; from 1030° C., cool down to room temperature in about 3 hours. The capacitors were terminated with Du Pont Pd/Ag (1/2) 8263 and fired at 850° C. for 10 minutes. The capacitance and the dissipation factor of four capacitors were:

| Capacitance (pf.): | Dissipation Factor (percent) |
|---|---|
| 4800 | 3.0 |
| 3700 | 2.7 |
| 4900 | 2.8 |
| 5000 | 3.0 |

Thus, effective multilayer capacitors were produced by co-firing the dielectric and metallization at temperatures substantially above the melting point of silver.

Example 3

Palladium/silver metallizing compositions containing (c) 4% and (d) 2.39% copper aluminate, based on the weight of noble metal, were used to prepare capacitors (with two buried electrodes in the dielectric).

Dielectric tape was prepared utilizing the procedure of Example 2 but the inorganic solids used had the following composition (weight percent): $BaTiO_3$, 91.25; bismuthate glass (same as in Example 2), 7.0; $Cu_2O$, 0.25; and $Ta_2O_5$, 1.50. Capacitors with two buried electrodes in the dielectric were prepared following the procedure of Example 2. The electrode compositions used, (c) and (d), are listed in Table I. The capacitors were terminated with the same compositions as those used for the electrodes in the given capacitor, and the electrodes end terminations were co-fired with the dielectric. The firing schedule was: room temperature to 500° C. in about 1 hour and at 500° C. for 1 hour; from 500° C. to 900° C. in about 1 hour and at 900° C. for 1 hour; from 900° C. to 1030° C. in about 20 minutes and at 1030° C. for 16 hours; cooled to room temperature in about 4 hours. The cofired end terminations were solderable; the leads were attached by using 62 Sn/36 Pb/2 Ag solder. The capacitance and the dissipation factor were measured before and after subjecting the capacitors to a temperature-humidity-bias test (65° C., 95% relative humidity, 2 volts DC bias, for 225 hours). The results for both metallizations (c) and (d) are tabulated in Table II and illustrate the excellent stability of the capacitors produced by this invention.

TABLE I

| Components | Weight percent | |
|---|---|---|
|  | Metallization (c) | Metallization (d) |
| Silver | 51.95 | 52.93 |
| Palladium | 6.59 | 6.59 |
| Copper aluminate | 2.44 | 1.46 |
| Vehicle | 39.02 | 39.02 |

TABLE II.—CAPACITANCE AND DISSIPATION FACTOR
[Example 3, before and after temperature-humidity-bias test]

| Metallization (c) | | | | Metallization (d) | | | |
|---|---|---|---|---|---|---|---|
| Before test | | After test | | Before test | | After test | |
| Cap. (pf.) | D.F., percent | Cap. (pf.) | D.F., percent | Cap. (pf.) | D.F., percent | Cap. (pf.) | D.F., percent |
| 863 | 2.0 | 864 | 2.6 | 876 | 1.8 | 846 | 1.4 |
| 730 | 2.0 | 705 | 1.7 | 794 | 1.9 | 780 | 2.2 |
| 960 | 2.2 | 944 | 2.7 | 768 | 1.8 | 744 | 1.5 |
| 785 | 1.9 | 777 | 1.8 | 795 | 1.9 | 776 | 1.5 |
| 764 | 2.0 | 740 | 1.8 | 856 | 1.9 | 840 | 1.9 |
| 878 | 2.0 | 900 | 2.6 | 827 | 2.0 | 806 | 1.6 |
| 900 | 2.1 | 883 | 2.2 | 878 | 2.0 | 850 | 1.6 |
| 852 | 2.1 | 826 | 1.8 | 847 | 1.9 | 825 | 1.7 |
| 925 | 2.0 | 900 | 2.2 | 825 | 1.7 | 810 | 1.4 |
| 884 | 2.1 | 850 | 1.7 | 870 | 1.8 | 877 | 2.3 |

Example 4

A Ag/Pd metallizing composition containing about 8.17% copper aluminate based on the weight of Ag/Pd was used. The procedure of Example 3 was followed to make dielectric tape with the following inorganic solid composition (weight percent): $BaTiO_3$, 91.00; $Ta_2O_5$, 1.00; $Bi_2O_3$, 7.75; and $Cu_2O$, 0.25. Capacitors with two buried electrodes were prepared by the procedure of Example 3; the metallizing composition contained (weight percent): silver, 49.78; palladium, 6.22; copper aluminate, 4.98; and vehicle, 39.02. Capacitors were subjected to the temperature-humidity-bias test of Example 3. The results are found in Table III.

TABLE III.—CAPACITANCE AND DISSIPATION FACTOR
[Example 4, before and after temperature-humidity-bias test]

| Before test | | After test | |
|---|---|---|---|
| Cap. (pf.) | D.F., percent | Cap. (pf.) | D.F., percent |
| 1,116 | 2.2 | 1,113 | 2.4 |
| 1,025 | 2.4 | 990 | 1.5 |
| 1,057 | 2.0 | 1,045 | 2.6 |
| 1,105 | 2.4 | 1,090 | 2.0 |
| 996 | 2.0 | 985 | 1.7 |
| 1,090 | 2.5 |  |  |
| 1,002 | 2.6 | 976 | 1.8 |
| 975 | 2.0 | 950 | 1.5 |
| 1,068 | 2.2 | 1,027 | 1.6 |
| 1,014 | 2.5 | 974 | 1.6 |

The sixth capacitor was not subjected to the temperature-humidity-bias test. The two electrodes had length of 3 squares (i.e., the length was three times the width; the width was about 1/8 inch); the resistances of these electrodes were 0.126 ohm/sq. and 0.133 ohm/sq. This capacitor was cross-sectioned and the dielectric thickness between the two electrodes was measured and found to be 0.00257 inch. The dielectric constant was 1242.

Example 5

The invention is illustrated by a direct comparison of a metallization of this invention and silver, each fired at 1030° C. Even after firing at 1030° C. for 16 hours, the metallization of the present invention produced an electrically continuous coating, whereas a silver composition beaded even after 15 minutes at 1030° C.

Two silver electrodes, one with copper aluminate (8.33% based on Ag) and one without, were printed on pressed ceramic disc made from tape composition of Example 3. Data are listed in Table IV:

TABLE IV

| | Invention | Comparative |
|---|---|---|
| Composition, wt. percent: | | |
| Silver | 55.0 | 60.0 |
| Copper aluminate | 5.0 |  |
| Vehicle | 40.0 | 40.0 |
| Firing | 1,030° C./16 hrs. | 1,030° C./15 min. |
| Results | No apparent coalescence. | Coalesced metal beads. |
| Conductivity | 0.150 ohm/sq. | Electrically open (discontinuous). |
| Photomicrograph at about 70X | Continuous structure. | Coalesced beads. |

Examples 6–9

When capacitors are made as in Examples 1 and 3, but using as the copper compound $CuO \cdot Fe_2O_3$, $CuO \cdot Mn_2O_3$, $CuO \cdot Co_2O_3$, or $Cu_2O \cdot Cr_2O_3$, an improvement in effective melting point of silver-based metallizations, similar to that reported in Example 1, is obtained.

I claim:

1. Metallizations consisting essentially of a finely divided silver or palladium/silver powder and a finely divided crystalline inorganic polynary oxide compound of copper melting above 1000° C., the amount of said compound of copper being effective to prevent coalescence of the noble metal and consequent circuit interruption on firing, said metallizations being useful to produce conductor patterns which are fireable above the melting point of silver.

2. Metallizations according to claim 1 dispersed in an inert liquid vehicle.

3. Metallizations according to claim 1 wherein the amount of said copper compound is in the range of about 0.5–30% by weight of the weight of noble metal powder.

4. Metallizations according to claim 3 wherein said copper compound is $Cu_2Al_2O_4$.

5. Metallizations according to claim 3 wherein said copper compound is $Cu_3TiO_5$.

6. Metallizations according to claim 3 wherein said copper compound is $CuO \cdot Fe_2O_3$.

7. Metallizations according to claim 3 wherein said copper compound is $CuO \cdot Mn_2O_3$.

8. Metallizations according to claim 3 wherein said copper compound is $CuO \cdot Co_2O_3$.

9. Metallizations according to claim 3 wherein said copper compound is $Cu_2O \cdot Cr_2O_3$.

10. Metallizations according to claim 3 wherein the amount of copper compound is in the range of 0.5–10%.

11. Metallizations according to claim 10 wherein the copper compound is $Cu_2Al_2O_4$.

12. Metallizations according to claim 10 wherein the copper compound is $Cu_3TiO_5$.

13. Metallizations according to claim 10 dispersed in an inert liquid vehicle.

14. Metallizations according to claim 11 dispersed in an inert liquid vehicle.

15. Metallizations according to claim 12 dispersed in an inert liquid vehicle.

References Cited

UNITED STATES PATENTS 3,135,601   6/1964   Peiffer _____ 75—206

OTHER REFERENCES

Chemical Abstracts, vol. 55, col. 11278d–g (1961).

JOHN D. WELSH, Primary Examiner

U.S. Cl. X.R.

106—1